United States Patent [19]

Manquen

[11] Patent Number: 4,469,265
[45] Date of Patent: Sep. 4, 1984

[54] TAPE HANDLING DEVICE

[76] Inventor: Charles D. Manquen, 1694 Calle Zocalo, Thousand Oaks, Calif. 91360

[21] Appl. No.: 436,997
[22] Filed: Dec. 17, 1982
[51] Int. Cl.³ .............................................. B65H 17/32
[52] U.S. Cl. ........................................ 226/97; 226/7; 226/118
[58] Field of Search .................. 226/7, 10, 24, 33, 95, 226/97, 118, 119; 242/182–185

[56] References Cited

U.S. PATENT DOCUMENTS

| | | | |
|---|---|---|---|
| 3,282,486 | 11/1963 | Moss | 226/181 |
| 3,499,589 | 3/1970 | Johnson et al. | 226/97 |
| 3,512,692 | 5/1970 | Horton | 226/25 |
| 3,608,798 | 9/1971 | Lawless | 226/25 |
| 3,633,807 | 1/1972 | Williams | 226/97 |

Primary Examiner—Leonard D. Christian
Attorney, Agent, or Firm—Haller, John L.

[57] ABSTRACT

A tape handling device for the handling and storage of an endless flexible tape is described. The device may be used in conjunction with audio recorders, equipment controllers, data processors, or other systems requiring signal storage on tape. The device includes a storage bin having tape entrance and exit ports and a central storage area in which the majority of the tape is stored at any time in a series of serpentine folds. A tape drive mechanism drives the tape out of and into the bin and past a transducer head or heads. A vacuum plenum is connected to the storage bin for drawing air into the bin through the ports and out of the bin through the plenum connection, the air flow acting to draw the tape into the bin through the entrance port.

14 Claims, 6 Drawing Figures

TAPE HANDLING DEVICE

BACKGROUND OF THE INVENTION

The present invention relates to a tape handling device for the handling and storage of an endless flexible tape of the type in which the majority of a tape is stored in serpentine loops or folds in a horizontal storage bin and a tape drive mechanism drives the tape in a path between exit and entrance openings of the bin. The invention is particularly concerned with the handling and storage of endless magnetic tapes in such fields as audio recording, equipment controllers and data processing where an endless tape is run continuously past associated transducer heads.

One of the problems in these devices is twisting, tangling and possible breaking stresses on the tape due to internal electrostatic forces and mechanical stresses on the tape. Some prior art tape handling devices of this kind are described in U.S. Pat. Nos. 3,499,589 and 3,608,798. In both of these devices, jets of air are directed at the tape at the entrance and exit openings in order to reduce the tendency of the tape to tangle and twist. The air jets hold the tape away from the walls at the entrance and exit openings. However, the air pressure in the storage bin as a result of the air jets directed into the bin, makes it more difficult to push the tape into the bin. This can cause bunching up and stopping of the tape at the entrance opening.

SUMMARY OF THE INVENTION

The present invention provides a tape handling device which reduces the risk of bunch-up, twisting or tangling of the tape.

The tape handling device of this invention includes a tape storage bin disposed in a horizontal plane in which the majority of an endless tape is stored in serpentine loops, the bin having a tape entrance port and a tape exit port. A tape drive mechanism drives the tape between the exit and entrance ports. A vacuum plenum communicates with the storage bin such that air is drawn into the bin through the entrance and exit ports. The air flow at the entrance port acts to positively draw the tape into the bin, eliminating or reducing the risk of the tape bunching up at the entrance. This inward flow of air surrounds the tape and propels it inward to form contiguous loops or noodles which in turn, form a tape storage pack within the bin. The tape is supported at its lower edge by the floor of the bin.

The storage bin is preferably of varying depth along the tape path through the bin. In a preferred embodiment, the depth of the bin is less in the areas adjacent the entrance and exit ports than in the central storage area of the bin. The arrangement is preferably such that there is little clearance between the upper edge of the tape and the roof of the storage bin in the entrance and exit areas of the bin. This can be achieved, for example, by providing the bin with a stepped lid.

The varying depth of the bin gives rise to differential pressure zones with higher pressure areas adjacent the entrance and exit ports. Thus, the tape is urged into the central storage area of the bin, where the propulsive force decreases due to the increased clearance between the tape and the lid. The tape is maintained in a generally neutral condition as it is urged towards the exit port by the tape simultaneously being drawn from the exit and introduced at the entrance.

As the tape nears the exit port area, the pressure increases again and the air being drawn in through the exit port surrounds the tape to support it and generally buffers it, or keeps it away from the bin's exit wall. This reduces the tendency for tape bunch-up at the exit port.

Preferably the exit port is located on a wall of the bin opposite to the entrance port and aligned with the entrance port. Preferably the entrance port is substantially larger than the exit port. The exit port may comprise a narrow vertical slit straddled by two exit nozzles which admit air to the exit area of the bin. The large-throat entrance port permits the tape to form large bends or noodles in the central storage area by the side-to-side movement allowed at the entrance port. This permits a greater length of tape to be stored. With a narrow nozzle entrance, only small noodles can be formed, decreasing storage capacity and increasing the risk of tape bunch-up. The tape is directed towards and presented to the entrance port via a drive capstan.

According to the preferred feature of the invention, a pneumatic buffer zone may be provided at the exit port. Tape leaving the bin through the exit port follows a single looped path through the buffer zone. The buffer zone comprises a column with a series of vents communicating with the vacuum chamber. The column serves as a non-linear massless spring which increases the hold-back force on the tape as the tape's loop path shortens. Thus if an intermittent tug occurs, the tape's loop path will shorten and uncover more exhaust vents behind it, increasing the pressure which draws the tape into the buffer zone. This will minimize changes in tape tension at high operating speeds. Preferably, a pressure tranducer is located in the buffer column, to stop the tape drive, or activate an alarm, or both, if it detects a loss of vacuum within the column. This would occur if the tape jammed within the bin and the loop was pulled completely out of the column.

Accordingly, it is an object of the present invention to provide a tape handling device which acts to positively pull tape into a tape storage bin.

It is a further object of this invention to provide a tape handling device in which the risk of bunch-up, tangling or twisting of the tape is reduced or minimized, and a greater storage capacity is thus possible.

BRIEF DESCRIPTION OF THE ACCOMPANYING DRAWINGS

The following is a brief description of the accompanying drawings.

DESCRIPTION OF THE PREFERRED EMBODIMENT

Figures 1, 2, 3:
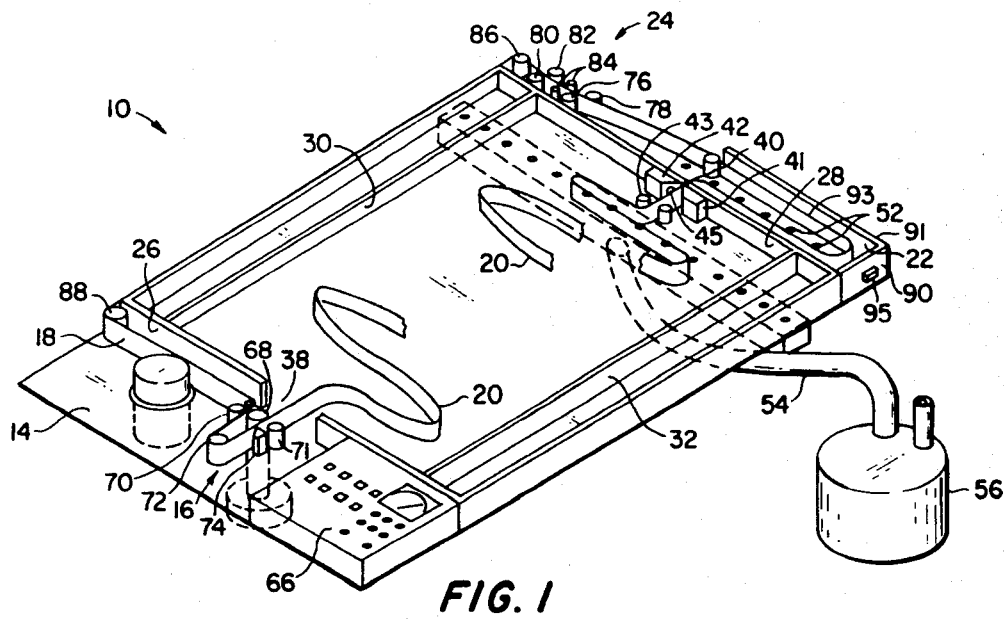
FIG. 1 is a perspective view of a tape handling device according to the present invention.
FIG. 2 is a horizontal cross section through the storage bin and buffer column of the device of FIG. 1, taken generally along line 2—2 of FIG. 1.
FIG. 3 is an expanded partial vertical section through the storage bin and buffer column taken along line 3—3 of FIG. 2, showing the entrance and exit areas of the storage bin.

A tape handling device 10 according to a preferred embodiment of the present invention is shown in FIGS. 1 to 3. The device basically comprises a storage bin 12 mounted on a horizontal support 14 and a tape drive mechanism 16 for feeding an endless tape 18 into and out of the bin 12. At any one time, the majority of the tape 18 is stored in the bin 12 in the form of a pack of serpentine loops or noodles 20. In practice, the loops will be much more closely packed than shown in FIG. 1. As used herein, the tape 18 may be any long thin film, such as magnetic tape, paper tape, or film such as photographic film.

As best shown in FIGS. 2 and 3, the storage bin 12 has opposite end walls 26 and 28, adjustable side walls 30 and 32, a horizontal floor 34 which supports the lower edge of the tape, and a lid 36 of stepped cross section. The side walls 30 and 32 are slidable inwards and outwards on end walls 26 and 28 to change the volume, and thus the storage capacity of bin 12. A tape entrance port 38 is located in end wall 26 adjacent drive mechanism 16 and a tape exit port 40 is located opposite the entrance port in end wall 28.

The stepped lid 36, as shown in FIG. 3 has thickened end portions 58 and 60, adjacent the end walls 26 and 28, respectively, defining reduced depth entrance and exit areas or zones 25 and 27 to the bin and an increased depth central storage area 64 between the inner edges 61 and 62 of the thickened portions 58 and 60. The thinner portion of the lid 36 above central area 64 preferably has exterior mounted support bars (not shown) mounted to it to prevent it from deforming. The storage pack of looped tape 20 is located in central storage area 64. There is very little clearance between the upper edge of the tape 18 and the undersurface of the lid 36 in the entrance and exit zones 25 and 27. In a preferred embodiment for storing a tape 2 inches in height, the depth of the bin in the entrance and exit zones 25 and 27 is about 2.02 inches, and in the central storage area 64 is about 2.09 inches.

Two lines of exhaust ports 50 and 51 are located in the floor 34 of the bin 12, adjacent the entrance side and exit side of the central storage area 64, respectively, as defined by inner edges 61 and 62 of the lid 36. They are connected via vacuum plenum 48 and line 54 to a vacuum pump 56, as shown in FIG. 1. Air will flow into the bin 12 through the entrance and exit ports 38 and 40, and out through the exhaust ports 50 and 51, forming air flow barriers or stops at opposite ends of the central storage area 64 which tend to maintain the tape loop storage pack 20 within area 64. Although two rows of exhaust ports 50 and 51 are shown, an alternative embodiment is possible with only one row 51 adjacent the exit zone 27 of the bin 12. A pressure transducer (not shown) is located in the vacuum plenum 48 to monitor the air flow.

In an alternative configuration (not shown), the vacuum plenum and exit ports may be located in the lid of the bin. Desirably, exhaust ports which are located in the lid are not inadvertently blocked if the tape should happen to lay down. Further, the vacuum pump 56 may be mounted remotely to the bin and provide a vacuum means through an external vacuum distribution network which may be attached to a number of the tape handling devices.

The entrance port 38 is relatively wide, allowing some degree of side-to-side movement of the tape 18 entering the bin 12, whereas exit port 40 is a narrow vertical slit. Shaped plate members 41 having inclined faces 42 straddling exit port 40 define an exit nozzle 33 to direct tape 18 through port 40. The members 41 are adjustably mounted so that they can be moved to increase or decrease the width of nozzle 33. Exit port 40 is straddled by exit vents 44 which admit air into the exit area 27 of the bin 12 via openings 45 in plate members 41. The sizes of vents 44, and thus the air flow to the exit area, can be determined by adjustment of shutter blades 46, as shown in FIG. 3. Stands 43 straddling the tape path in the exit area 27 act as supports for the lid 36 to hold it away from the upper edge of the tape 18.

After leaving exit port 40 the tape passes into a buffer column 22 defined by wall 28 of the bin, end wall 90, side wall 91, and lid 92, as shown in FIGS. 2 and 3. The depth of column 22 is only slightly greater than the height of the tape 18, such that when the tape 18 passes through the column 22 in a loop 93, a substantially closed pressure chamber is defined in the area 94 behind the loop 93. The buffer column 22 has a row of exhaust vents 52 in its floor which are also connected to the vacuum plenum 48 as shown in FIG. 3. A pressure transducer 95 monitors the pressure area 94.

The drive mechanism 16 will now be described with reference to FIG. 1. The tape drive mechanism 16 is adjacent to and aligned with entrance port 38. The mechanism 16 is of a known kind as described in U.S. Pat. No. 3,282,486, and comprising a differential drive capstan 68 and pinch rollers 70 and 71 for holding the tape 18 against the drive capstan 68. The tape 18 passes between the first pinch roller 70 and the capstan 68, around a reversing capstan 72, and is then engaged between the drive capstan 68 and second pinch roller 71. From here the tape 18 is directed into the entrance port 38.

The first pinch roller 70 is dimensioned to press the tape 18 against a first drive zone or zones of the differential capstan 68, so as to drive the tape 18 at a given speed. The second pinch roller 71 is dimensioned to press the tape 18 against a different drive zone or zones of the capstan 68, so as to drive the tape 18 at a higher speed. The speed differential together with the reversing capstan 72 causes the tape 18 to form a tensioned loop.

A transducer 74 contacts the tape loop between the reversing capstan 72 and drive capstan 68. The differential drive mechanism is such that tape 18 travels across the transducer at substantially constant speed and uniform tension. Transducer 74 may, for example, comprise a tape record or read head. A further transducer may be positioned at the other side of the tape loop. Additional transducers may be positioned against the tensioned loop of the tape, for use in multi-channel high speed recording. Although the drive mechanism 16 is shown positioned in front of the entrance port 38, it may alternatively be located anywhere in the tape path between exit port 40 and entrance port 38.

The tape cleaning mechanism 24, as shown in FIG. 1 is continuously renewing and comprises motor drive take-up spools 76 and 78, each associated with a respective supply hub 80 and 82 containing wiping fabric 81. Wiping fabric 81 is fed from each supply hub 80 and 82 to its associated take-up spool 76 and 78 through a pair of elastically supported, opposed mandrels 84. The mandrels 84 act to press the wiping fabric against opposite faces of the tape 18 as it passes through the cleaning mechanism 24. The mandrel pressure creates a small drag force tending to hold the tape on the tape guides 86 and 88. A sensor detects when either supply of wiping fabric 81 runs out and activate an indicator to notify the user that the supply needs to be renewed.

From the cleaning mechanism 24 the tape passes around guide rollers 86 and 88 before being fed back into the tape drive mechanism 16.

Figure 5:
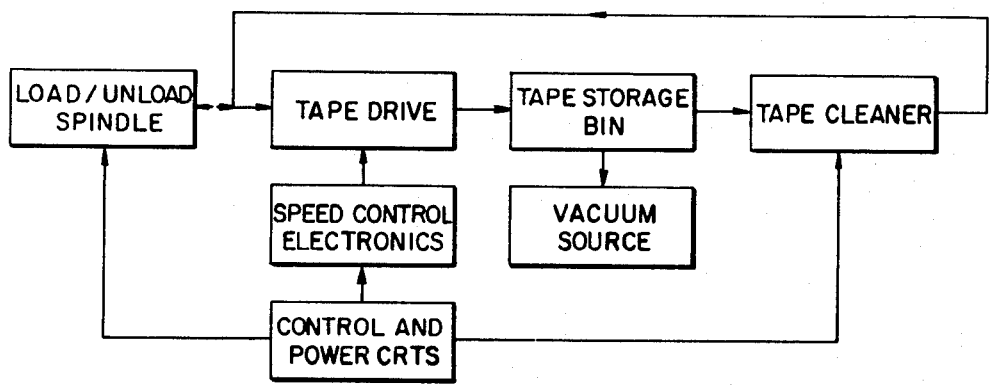
FIG. 5 is a block diagram of the control mechanism for the tape handling device.

FIG. 5 is a block diagram showing the tape flow path between the various components of the device and the control connections to these components. The control circuit operates to turn off the drive on detection of excessive tape tension, loss of pressure in vacuum plenum 48 or buffer column 22.

Figure 6:
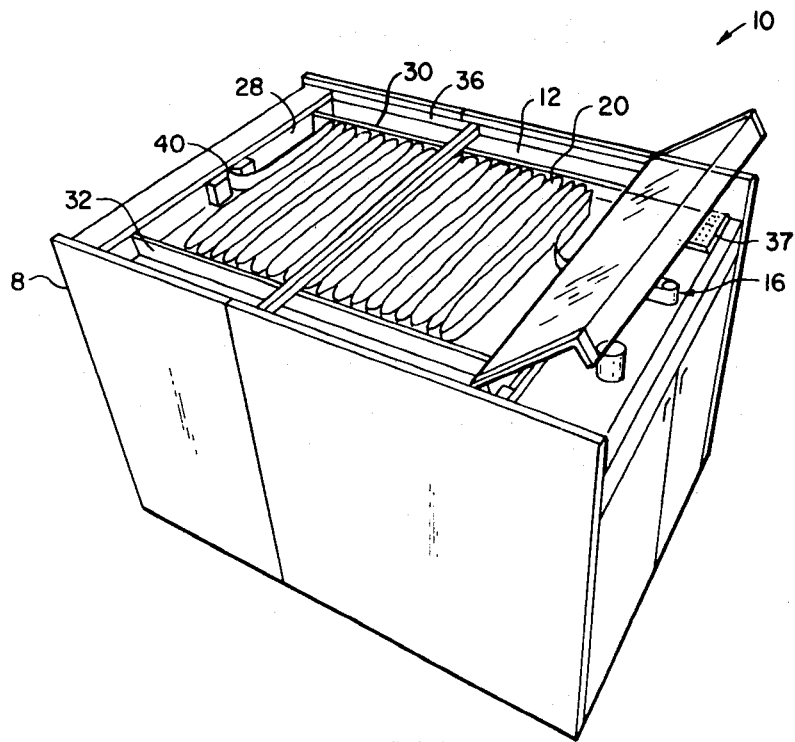
FIG. 6 is a perspective view of a tape handling device in accordance with the present invention shown mounted in a commercial enclosure.

FIG. 6 is a pictorial representation of a tape handling device 10 shown mounted in a conventional enclosure. The storage bin 12 is horizontally supported in a rectangular housing 8 such that the bin is generally located at work bench height. The control circuitry and vacuum pump are mounted within the housing. The enclosure is shown open partially exposing the drive mechanism 16 and the control components 37.

When the tape handling device 10 is in use, tape 18 is driven around a path outside the bin 12 and into the serpentine looped storage pack 20 within the bin 12. The connection of the storage bin 12 to vacuum plenum 48 causes air to be sucked into the bin 12 through the wide entrance port 38 and through the exit vents 44 adjacent exit port 40.

The inward flow of air at entrance port 38 acts to positively draw the tape 18 into the bin 12. The air flow acts to hold the tape 18 away from the entrance wall 26 of the bin 12, reducing the risk of tape 18 striking or tangling due to electrostatic forces or mechanical stresses, for example. The wide area entrance port 38 with this air suction technique allows the tape 18 to move from side to side and form large noodles or loops 20 in the storage area, giving a greater storage capacity. With a bin 12 area of 43 inches by 39 inches, a continuous tape of 2,500 feet in length can be stored easily, and lengths up to 3,400 feet are possible. By adjusting the position of side walls 30 and 32, this length can be reduced below 1,200 feet down to 200 or 300 feet.

The varying depth of the bin 12, discussed in connection with FIG. 3 above, together with the positioning of exhaust ports 50 and 51, gives rise to differential pressure zones between the entrance and exit zones 25 and 27 and the central storage area 64 of the bin 12. There will be higher pressure and thus higher velocity inward air flow in the reduced depth areas adjacent entrance and exit ports 38 and 40. The air flow will be in through the entrance and exit ports 38 and 40 and then down through the exhaust ports 50 and 51. This forms pressure discontinuities or barriers at the inner edge 61 of thickened portion 58 and at the inner edge 62 of thickened portion 60, respectively. These acts as pneumatic support boundaries and constrain the leading and trailing edges of the looped storage pack 20 within central area 64 directly below edges 61 and 62. This reduces the risk of loops reaching the entrance or exit ports and causing tangles and blockages. Thus the length of the storage pack is determined by the positioning of the entrance and exit inner edges 61 and 62 and exhaust vents 50 and 51.

As the tape 18 migrates into the central storage pack 20, the pneumatic propulsive force decreases due to the increased clearance above the tape and the positioning of the exhaust vents 50 and 51 at opposite ends of the storage area 64, so that the air flow will not interfere with the looped storage pack 20. The tape 18 is maintained in a neutral position as it is urged towards the exit by the simultaneous exiting and incoming of the tape loops.

As the tape 18 passes into the reduced depth exit zone 27, air flowing inward through the exit port 40, nozzles 44 and openings 45 acts to hold the tape away from the exit bin wall 28. The tape 18 is pulled through the exit port 40 into buffer column 22 where it forms loop 93. The length of loop 93 is dependent on the tape holdback tension in area 94 as graphically illustrated in FIG. 4.

Figure 4:
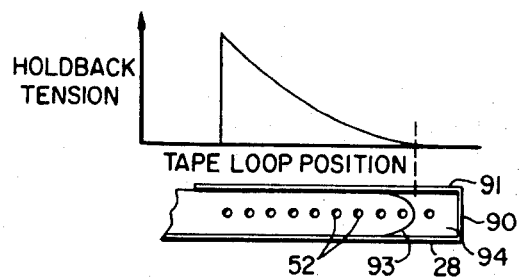
FIG. 4 is a sketch graph showing the variation of holdback tension with tape loop position in the buffer column.

The chamber 22 is connected with the vacuum plenum 48 via the line of ports 52. The pressure in area 94 behind loop 93 is dependent on the number of ports 52 uncovered by the loop. Thus, if there is a sudden tug on the tape 18, the loop 93 will shorten, uncoverning more ports 52 behind it. This increases the holdback force on the tape 18 as shown in FIG. 4. The curve in FIG. 4 is dependent on the number, size and position of the ports 52 and on the plenum pressure. The buffer column 22 therefore acts to minimize intermittent and sudden tension changes in the tape 18 and is particularly useful at high tape speeds. It can be thought of as serving as a non-linear massless spring.

The pressure transducer 92, acts to sense the loss of vacuum in area 91, which would occur if the tape jammed in the bin 12 and the tape drive 16 pulled the loop 90 completely out of the chamber. The signal from the transducer 92 may be used to stop the tape drive, to activate an alarm, or both.

The range of nominal tape speeds possible with a tape handling device of this invention is from about 7.5 inches per second to about 60 inches per second, however, tape speeds as high as 150 inches per second have been tested with excellent results.

It is understood that the description herein of the invention is done to fully comply with the requirements of 35 USC Section 112, and is not intended to limit the invention in any way. Thus, varying forms of the herein described tape handling device, which are within the scope of the present invention, could easily be developed. Such varying forms are considered to be within the scope and essence of this invention.

What is claimed is:

1. A tape handling device for transport and storage of an endless tape, comprising a tape storage bin with its floor disposed in a horizontal plane, said bin defining a central storage area, the majority of an endless tape being stored in said central storage area of said bin in serpentine folds with the lower edge of the tape supported by the floor of said bin, said bin having a tape entrance port through which tape enters said bin and a tape exit port through which tape leaves said bin; and
   a tape drive means for driving said tape outside said bin between said exit port and said entrance port;
   a vacuum means and a vacuum plenum; and
   a communicating means between said vacuum plenum and said storage bin such that air is drawn into said bin through said entrance and exit ports and out of said bin through said communicating means, said air flow acting to draw said tape into said bin through said entrance port.

2. A device as claimed in claim 1, including control means for operating said tape drive means and cutting off said drive in response to detection of an improper tape flow signal.

3. A tape handling device for transport and storage of an endless tape, comprising;
   a tape storage bin disposed in a horizontal plane and having a central storage area in which the majority of an endless tape is stored in serpentine folds, said bin having a tape entrance port through which tape enters said bin and a tape exit port through which tape leaves said bin;
   a tape drive means for driving said tape outside said bin between said exit port and said entrance port;
   a vacuum means and a vacuum plenum; and
   a communicating means between said vacuum plenum and said storage bin such that air is drawn into said bin through said entrance and exit ports and out of said bin through said communicating means, said air flow acting to draw said tape into said bin through said entrance port;
   said bin being of varying depth along the tape path through the bin, the depth being less in entrance and exit zones adjacent said entrance and exit ports than in said central storage area in which said serpentine folds of tape are formed into a tape storage pack.

4. The device as claimed in claim 3, wherein said bin has stepped lid having thickened areas at opposite ends defining said reduced depth entrance and exit zones.

5. The device as claimed in claim 3, wherein said communicating means comprises a plurality of exhaust vents in the floor of said bin.

6. The device as claimed in claim 3, wherein said communicating means comprises a line of exhaust vents in the floor of said bin, said line stretching across said tape path and being positioned in said central storage area adjacent to said exit zones.

7. The device as claimed in claim 6, wherein said floor has a further line of exhaust vents communicating with said vacuum plenum, said further line stretching across said tape path, and being located in said central storage area adjacent said entrance zone.

8. The device as claimed in claim 3, further including a buffer column through which said tape passes in a loop after leaving said exit port, and variable communicating means connecting said buffer column to said vacuum plenum, said variable communicating means being controlled by the length of said loop such that a variable holdback force is applied to said tape dependent on the length of said loop.

9. The device as claimed in claim 8, said buffer column having a line of exhaust vents in its floor comprising said buffer column communicating means, said buffer column being dimensioned such that said tape loop defines a variable vents in said pressure chamber and the resultant holdback force on said tape loop being determined by the length of said loop.

10. The device as claimed in claim 8, further including a pressure transducer for detecting loss of vacuum in said buffer column.

11. The device as claimed in claim 3, wherein said entrance port is substantially larger than said exit port, said exit port comprising a vertical slit of dimensions large enough to permit passage of the tape.

12. The device as claimed in claim 3, wherein said bin has a lid and said communicating means comprises a plurality of exhaust vents in the lid of said bin.

13. The device as claimed in claim 3, wherein said vacuum means comprises a vacuum pump mounted adjacent said bin.

14. The device as claimed in claim 3, including means for detecting improper tape flow and control means for operating said tape drive means and cutting off said drive in response to said detection means detecting an improper tape flow.

* * * * *